United States Patent
Edpalm et al.

(10) Patent No.: US 11,025,906 B2
(45) Date of Patent: Jun. 1, 2021

(54) METHOD FOR INTRA REFRESH ENCODING OF A PLURALITY OF IMAGE FRAMES

(71) Applicant: Axis AB, Lund (SE)

(72) Inventors: Viktor Edpalm, Lund (SE); Maya Shah, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/678,131

(22) Filed: Nov. 8, 2019

(65) Prior Publication Data
US 2020/0169727 A1 May 28, 2020

(30) Foreign Application Priority Data
Nov. 22, 2018 (EP) ..................... 18207682

(51) Int. Cl.
*H04N 19/105* (2014.01)
*H04N 19/139* (2014.01)
*H04N 19/172* (2014.01)
*H04N 19/513* (2014.01)

(52) U.S. Cl.
CPC ......... *H04N 19/105* (2014.11); *H04N 19/139* (2014.11); *H04N 19/172* (2014.11); *H04N 19/521* (2014.11)

(58) Field of Classification Search
CPC ..... H04N 19/57; H04N 19/105; H04N 19/107
See application file for complete search history.

(56) References Cited

U.S. PATENT DOCUMENTS

| 7,974,479 B2 * | 7/2011 | Tsukuda | H04N 19/14 382/232 |
| 8,218,641 B2 | 7/2012 | Wang | |
| 10,652,572 B2 * | 5/2020 | Lu | H04L 43/0852 |
| 2008/0260266 A1 * | 10/2008 | Tsukuda | H04N 19/107 382/232 |

(Continued)

FOREIGN PATENT DOCUMENTS

| EP | 0579450 A2 | 1/1994 |
| EP | 1921867 A1 | 5/2008 |

(Continued)

OTHER PUBLICATIONS

R.M. Schreier et al "Motion adaptive intra refresh for the H.264 video coding standard", IEEE Transactions on Consumer Electronics, vol. 52, No. 1, Feb. 1, 2006 ("A" reference).

*Primary Examiner* — Boubacar Abdou Tchoussou
(74) *Attorney, Agent, or Firm* — Volpe Koenig (57) ABSTRACT

Video encoding is provided using periodic intra refresh, which can adapt padding of an intra encoding region between image frames based on a current level motion in the image frame. Upon a current level of motion not exceeding a first threshold, an intra encoding region of the image frame according to a predefined periodic intra refresh pattern is intra encoded. Upon the current level of motion exceeding the first threshold, the intra encoding region of the image frame is expanded to overlap to a determined extent with a previously encoded intra encoding region among the plurality of image frames, and the expanded intra encoding region of the image frame is intra encoded. Regions of the image different from the intra encoding regions and the expanded intra encoded region, respectively are inter frame encoded.

15 Claims, 5 Drawing Sheets

(56) References Cited

U.S. PATENT DOCUMENTS

| | | |
|---|---|---|
| 2011/0235929 A1 | 9/2011 | Mizosoe et al. |
| 2012/0033730 A1 | 2/2012 | Lee |
| 2013/0114697 A1* | 5/2013 | Siddaramanna ..... H04N 19/167 375/240.03 |
| 2014/0072034 A1* | 3/2014 | Tanner ................ H04N 19/176 375/240.03 |
| 2015/0146780 A1* | 5/2015 | Miyoshi ............... H04N 19/174 375/240.12 |
| 2017/0013274 A1 | 1/2017 | Sadhwani et al. |
| 2017/0318308 A1* | 11/2017 | Lu ........................ H04L 1/0018 |

FOREIGN PATENT DOCUMENTS

| | | |
|---|---|---|
| JP | 2013-165340 A | 8/2013 |
| WO | 2007/129911 A2 | 11/2007 |

* cited by examiner

METHOD FOR INTRA REFRESH ENCODING OF A PLURALITY OF IMAGE FRAMES

TECHNICAL FIELD

The present invention relates to video encoding using periodic intra refresh, and specifically to a method and an encoder which can adapt padding of an intra encoding region between image frames based on motion in the image frame.

BACKGROUND

A common problem with H.264 encoding (and similar standards) is the I-frame bitrate spike. This problem is often worse for surveillance cameras since a vast number of cameras may exist on the same network and a typical surveillance scene has a very large (×10-×100) I-frame vs P-frame size ratio. Ideally, the network would prefer a constant bitrate.

One solution to reduce the bitrate spike for a camera is to spread the I-frame over a plurality of image frames and instead have a part (intra refresh region) of each image frame forced to be encoded as I-blocks. The intra refresh region is moved across the image frame over a set of image frames, thereby "refreshing" the image. This method is called periodic intra refresh or just intra refresh.

However, this method comes with an undesirable bitrate penalty. To work, the intra refresh requires an update pattern of the intra refresh region which is adapted for movement in image data of the image frame, e.g. resulting from motion in a captured scene, or due to movement of the camera while capturing the scene, such that the block matching algorithm still can function well. This in turn means that in many occasions, an unnecessary part of the image frame is enforced to be encoded as I-blocks.

There is thus a need for improvements within this context.

SUMMARY

In view of the above, overcoming or mitigating at least some of the problems discussed above would be desirable. In particular, methods, devices, software, and systems for dynamically selecting a size of a region of an image frame that should be intra encoded based on a level of motion associated with the image frame are provided.

According to a first aspect, there is provided a method for intra refresh encoding of a plurality of image frames of a video stream, wherein the intra refresh encoding is based on a predefined periodic intra refresh pattern defining a region of an image frame that should be intra encoded, the method comprising, for each image frame:
  receiving a current level of motion associated with the image frame, the current level of motion estimating how big a part of image data of the image frame has changed compared to image data of a previously encoded image frame of the video stream,
  determining an intra encoding region of the image frame according to the predefined periodic intra refresh pattern.
In case the current level of motion does not exceeds a first threshold, the method comprises:
  intra encoding the intra encoding region of the image frame, and
  inter frame encoding the remaining image frame;

In case the current level of motion exceeds the first threshold, the method comprises:
  expanding the intra encoding region of the image frame to overlap with a previously encoded intra encoding region among the plurality of image frames to a determined extent,
  intra encoding the expanded intra encoding region of the image frame, and
  inter frame encoding the remaining image frame.

By "inter frame encoding" is generally meant that the remaining image frame, i.e. the part which is not forced to be intra encoded, is encoded as a P-frame or B-frame. This in turn means macroblocks of the remaining frame are either inter encoded or intra encoded, a decision that is up to the encoder to make depending on e.g. an outcome of the block matching, a size of the residual etc.

By "periodic intra refresh pattern" is generally meant a cyclic pattern which defines which region/portion/macroblock(s) of an image frame that should be forced to be intra encoded, i.e. encoded as I-blocks. The pattern is periodic/cyclic which means that for every n image frame, the pattern starts over.

A current level of motion is received, which estimates how big a part of image data of the image frame has changed as compared to image data of a previously encoded image frame of the video stream. The previously encoded image frame may be a temporally preceding image frame of the video stream or a temporally subsequent image frame of the video stream (i.e. in the case of B-frame encoding). The motion level may be computed by another unit connected to the encoder implementing the present embodiment or be computed by the encoder. The motion level may be determined in any suitable way, e.g. by comparing image data of the image frame to be encoded with image data of a preceding frame in the video stream. In some embodiments, the motion level is determined/computed for a previously encoded image frame, and that motion level is used as an estimation of the current level of motion, i.e. the level of motion for the image frame to be encoded. Advantageously, this allows for e.g. only determining motion levels for every second, third, fifth, etc., image frame, which reduces the computational complexity. Such embodiment also facilitates a distributed architecture for encoding the plurality of image frames of a video stream, since the motion detection can be performed separately, i.e. using another processor, and the level of motion may then be sent to the encoder to be used as an estimate for the level of motion for the image frame to be encoded. It should thus be noted that the level of motion needs not to be determined for the image frame for which it is subsequently used as an estimate when encoding. In some embodiments, the level of motion is determined for e.g. a frame preceding the frame to be encoded. However, such measure may still be a good estimate (best guess) for the level of motion of the frame to be encoded.

The present embodiments are based on the realization that a penalty for the intra refresh padding (i.e. the bitrate penalty which is related to having overlapping intra refresh regions between consecutive image frames in the video stream) is related to the ratio of the bitrate cost for intra encoding a block of pixels (I-block) as compared to the bitrate cost for inter frame encoding a block of pixels, which is in turn related to the motion level. Overlap may be needed in the case of motion in the image, to increase the possibility that an inter block having a specific image content can be referred to an intrablock in a previous image frame having the same or similar image content. However, the cost in bit rate for encoding an intra block is higher than the cost for encoding an inter block. Given this, by dynamically selecting an optimal level of intra refresh padding (i.e. overlap between intra encoding regions between image frames in the video stream), the bitrate penalty may be minimized. In other words, the coverage of the intra refresh region through a sequence of image frames is dynamically adjusted based on the level of motion in the image data, e.g. due to the level of motion in the depicted scene and/or due to adjustments of the field of view of the video capturing device (pan and/or tilt and/or zoom adjustments of the video capturing device).

Consequently, in the case of a low current motion level (i.e. below a first threshold), the determined intra encoding region (for example a slice or a tile of the image frame, or a plurality of macroblocks spread out over the image frame, or any other suitable configuration) used as is, i.e. as defined in the predefined periodic intra refresh pattern, and the encoding of macroblocks of the determined intra encoding region is forced to I-blocks. The remaining part of the image frame is inter frame encoded as defined above. Since the current level of motion is low, most of the macroblocks of the remaining part of the image frame will be encoded as inter blocks, even when the intra refresh padding between image frames is reduces/removed.

However, if the current level of motion does exceed the motion level threshold, the intra encoding region is expanded to a determined (predefined) extent. This means that the intra encoding region will overlap (or overlap more) with a previously encoded intra encoding region among the plurality of image frames, as compared to if the current motion level was not as high where no overlap, or less overlap, would occur. The remaining part of the image frame is inter frame encoded as defined above. Since padding is increased in this case, most of the macroblocks of the remaining part of the image frame will be encoded as inter blocks. However, the bitrate cost for the intra refresh region is increased, since the intra encoding region is expanded.

By defining the current motion level as an estimate of how big a part of image data of the image frame has changed as compared to image data of a previously encoded image frame of the video stream, this measure can be advantageously used for determining the extent of the intra refresh padding, since this estimate can be used for estimating how many macroblocks of the inter frame encoded part of the image frame that would end up as intra blocks if no padding or less padding was used. The estimated cost for the extra intra blocks due to motion can be weighed against the cost for encoding a larger part of the image frame as an intra refresh region, i.e. increasing the padding (i.e. expanding the intra refresh region).

According to some embodiments, for the plurality of image frames, the regions in the predefined periodic intra refresh pattern do not overlap. Consequently, when the current level of motion is below the first threshold, this results in that no padding between the intra encoding region of the image frame and a previously encoded intra encoding region among the plurality of image frames is employed. Advantageously, this may reduce the bitrate penalty for the intra refresh encoding.

According to some embodiments, the step of expanding the intra encoding region of the image frame comprises: expanding the intra encoding region of the image frame to overlap with an intra encoding region of an immediately preceding referenced image frame in the video stream. By reference image frame is meant the image frame which image data is used to define the image data of inter encoded macroblocks of the presently encoded image frame. Consequently, encoding efficiency may be increased. In other embodiments, GOP structures allowing multiple references in both temporal directions are employed, for example one backwards and one forward reference frame, or with a long term reference frame and an immediately preceding reference frame or with some mix of two preceding frames. In these cases, the expansion of the intra encoding region of the image frame should be done accordingly.

According to some embodiments, the method further comprises the steps of:

upon the current level of motion exceeding a second threshold, the second threshold being larger than the first threshold, expanding the intra encoding region of the image frame to overlap to a first extent with a previously encoded intra encoding region among the plurality of image frames, upon the current level of motion not exceeding the second threshold, expanding the intra encoding region of the image frame to overlap to a second extent with a previously encoded intra encoding region among the plurality of image frames, wherein the first extent is larger than the second extent.

In this embodiment, at least three levels of intra refresh padding are used. In some embodiments, the first extent represents a max padding, which means that even larger current level of motion does not lead to more padding. Using three levels of padding may represent a good balance between computational complexity of the encoding method and a possible reduction of bitrate penalty for the intra refresh encoding strategy.

According to some embodiments, the intra encoding region and the expanded intra encoding region each is defined by one or more slices or tiles. This embodiment may represent a low complexity way of defining the periodic intra refresh pattern and the intra refresh regions thereof. Using High Efficiency Video Coding (HEVC) codecs such as H.264 H.265, slices (H.264, H.265) and/or tiles (H.265) may facilitate parallel processing of the encoding, to increase efficiency. In other words, using a modern block based video codec such as H.264 H.265, VP9, AV1 slices and/or tiles may facilitate parallel processing of the encoding, to increase throughput. Moreover, slices/tiles may represent low complexity structures for defining the intra refresh region.

According to some embodiments, the predefined periodic intra refresh pattern defines an intra encoding region being displaced only in a vertical direction or in a horizontal direction between two consecutive image frames. For example, if first intra refresh region in the pattern corresponds to the leftmost column(s) of macroblocks, the next intra refresh region in the pattern may correspond to adjacent column(s) of macroblocks, and so on until the last intra refresh region which will correspond to the rightmost column(s) of macroblock. Then the pattern starts over with the left most column(s) again. Advantageously, this embodiment reduces the complexity of the periodic intra refresh pattern and the use thereof.

According to some embodiments, the predefined periodic intra refresh pattern defines an intra encoding region being displaced in a vertical direction, wherein the step of expanding the intra encoding region of the image frame comprises increasing a height of the intra encoding region of the image frame. For example, if the first intra encoding region defines the first three rows of macroblocks in the image data of the image frame, and the second intra encoding region defines row four to row six of macroblocks in the image data of the image frame, and expansion of the second intra encoding region would result in, for example, that the expanded intra encoding region would define row three to row six of macroblocks in the image data of the image frame. Similarly, in some embodiments, the predefined periodic intra refresh pattern defines an intra encoding region being displaced in a horizontal direction, wherein the step of expanding the intra encoding region of the image frame comprises increasing a width of the intra encoding region of the image frame.

According to some embodiments, upon the current level of motion not exceeding the first threshold, the method comprises adjusting a motion vector search range for the inter frame encoding of the remaining image frame from a current search range to a predefined search range. Since it is already estimated that low motion is present in the image data of the image frame to be encoded, this knowledge can advantageously be used for reducing (adjusting) the motion vector search range for the inter frame encoding. The predefined search range may, for example in the case of the regions in the predefined periodic intra refresh pattern do not overlap, be set to zero. Since no intra refresh padding is employed in this case, a motion vector search range of more than zero does not necessarily bring any advantage, and only results in an increased computational complexity for no use. In case regions in the predefined periodic intra refresh patterns overlap to some extent, for example with 16, 32, or 80 pixels, the predefined search range may be defined correspondingly, i.e. set to 16, 32 or 80 pixels.

According to some embodiments, the method comprises, upon the current level of motion exceeding the second threshold, adjusting the motion vector search range for the inter frame encoding of the remaining image frame to correspond to the first extent, and upon the current level of motion not exceeding the second threshold, adjusting the motion vector search range for the inter frame encoding of the remaining image frame to correspond to the second extent. Similar to what is described above, in case the first extent corresponds to 32 pixels (e.g. two macroblocks), and the second extent corresponds to 16 pixels, the motion vector search range may be set to the corresponding values depending on the current level of motion estimated for the image frame to be encoded. According to some embodiments, the motion vector search range is only limited in a direction corresponding to the direction of displacement of the intra encoded regions in the periodic intra refresh pattern. For example, if the predefined periodic intra refresh pattern defines an intra encoding region being displaced in a horizontal direction, the motion vector is limited according to the above in a horizontal direction.

In the above embodiments, the motion vector search range is advantageously adjusted in view of the determined overlap between intra encoded regions among the plurality of image frames. These embodiments may result in bitrate reduction and a reduced computational complexity of the encoding (due to e.g. a reduced search range when a low motion level is determined). In these embodiments, by defining the current motion level as an estimate of how big a part of image data of the image frame has changed as compared to image data of a previous image frame of the video stream, this measure can be advantageously used for determining the extent of the intra refresh padding, since this estimate can be used for estimating how many macroblocks of the inter frame encoded part of the image frame would end up as intra blocks if no motion search or less motion search was used. The estimated cost for the extra intra blocks due to no motion search or less motion search can be weighed against the cost for encoding a larger part of the image frame as an intra refresh region, i.e. increasing the padding (i.e. expanding the intra refresh region) and the motion search range.

According to a second aspect, an encoder is configured for intra refresh encoding of a plurality of image frames of a video stream depicting a scene, wherein the intra refresh encoding is based on a predefined periodic intra refresh pattern defining a region of an image frame that should be intra encoded, the encoder comprises a processor configured to:

receive a current level of motion in the scene, the current level of motion estimating how big a part of image data of the image frame has changed as compared to image data of a previously encoded image frame of the video stream;

determine an intra encoding region of the image frame according to the predefined periodic intra refresh pattern.

Upon the current level of motion not exceeding a first threshold, the processor is configured to:

intra encode the intra encoding region of the image frame, and inter frame encode the remaining image frame;

Upon the current level of motion exceeding the first threshold, the processor is configured to:

expand the intra encoding region of the image frame to overlap to a determined extent with a previously encoded intra encoding region among the plurality of image frames, intra encode the expanded intra encoding region of the image frame, and inter frame encode the remaining image frame;

According to some embodiments, the processor is further configured to, upon the current level of motion exceeding a second threshold, the second threshold being larger than the first threshold:

expand the intra encoding region of the image frame to overlap to a first extent with a previously encoded intra encoding region among the plurality of image frames, In case the current level of motion not exceeding the second threshold, the processor is configured to:

expand the intra encoding region of the image frame to overlap to a second extent with a previously encoded intra encoding region among the plurality of image frames, wherein the first extent is larger than the second extent.

According to some embodiments, the processor is further configured to, upon the current level of motion not exceeding the first threshold, adjust a motion vector search range for the inter frame encoding of the remaining image frame from a current search range to a predefined search range.

According to a third aspect, a system comprises a video capturing device, a motion detector, and an encoder according to the second aspect, wherein the video capturing device is configured to capture a video stream depicting a scene, the video stream comprising a plurality of image frames, and continuously transmit the image frames of the video stream to the motion detector and the encoder, and wherein the motion detector is configured to continuously detect a current level of motion in the captured image frames based on image data in the received image frames, and transmit the current level of motion to the encoder.

According to a fourth aspect, a computer program product comprises a computer-readable storage medium with instructions adapted to carry out the method of the first aspect when executed by a device having processing capability.

The second, third and fourth aspects may generally have the same features as the first aspect. It is further noted that the embodiments relate to all possible combinations of features unless explicitly stated otherwise.

BRIEF DESCRIPTION OF THE DRAWINGS

The above, as well as additional features, will be better understood through the following illustrative and non-limiting detailed description of preferred embodiments, with reference to the appended drawings, where the same reference numerals will be used for similar elements, wherein.

DETAILED DESCRIPTION OF EMBODIMENTS

The present embodiments will now be described more fully hereinafter with reference to the accompanying drawings. The systems and devices disclosed herein will be described during operation.

As described above, periodic intra refresh is an established method for removing the spikes in the bitrate that otherwise would occur once per GOP, i.e. when the image frame is encoded using intra-encoding. In the intra refresh strategy, a periodic intra refresh pattern is used for defining which part of an image frame that should be "refreshed" (i.e. encoded without reference to any other image frame), thus forced to be encoded as an intra-coded region.

Figure 1:
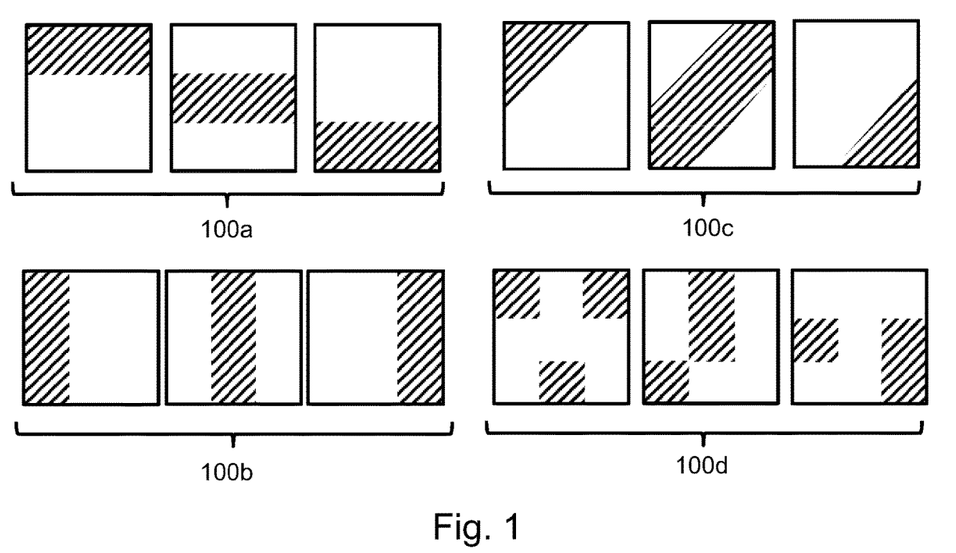
FIG. 1 schematically shows four different examples of predefined periodic intra refresh patterns which may be used.

Examples of such patterns are shown in FIG. 1. Each example includes three image frames for the entire image frame to be refreshed, but it should be understood that in a typical case, an intra refresh pattern cycles over a larger plurality of image frames, such as 32 or 64 etc.

In FIG. 1 (as well as in FIGS. 2-5), a dashed area represents an intra refresh region, and an unfilled area represents a remaining part of the image frame.

In the upper left example of FIG. 1, a periodic intra refresh pattern 100a is shown where complete rows of macroblocks in the image frame defines an intra refresh region. In some embodiments, the intra refresh region in the pattern 100a may be defined by one or more slices. In some embodiments, the intra refresh region comprises one row of macroblocks, which means that the intra refresh pattern cycles over a number of image frames equal to the number of rows of macroblocks in an image frame. In the top left example of FIG. 1, the periodic intra refresh pattern 100a defines an intra encoding region being displaced (staggered) in a horizontal direction between two consecutive image frames.

In the bottom left example of FIG. 1, a periodic intra refresh pattern 100b is shown where complete column(s) of macroblocks in the image frame defines an intra refresh region. In some embodiments, the intra refresh region in the pattern 100a may be defined by one or more tiles. In some embodiments, the intra refresh region comprises one column of macroblocks, which means that the intra refresh pattern cycles over a number of image frame equal to the number of columns of macroblocks in an image frame. The periodic intra refresh pattern 100b defines an intra encoding region being displaced (staggered) in a vertical direction between two consecutive image frames.

Other ways of defining the periodic intra refresh pattern are equally possible. FIG. 1 shows by way of example two more embodiments of such pattern. In the top right example, a periodic intra refresh pattern 100c is defined by a diagonal region moving from one corner of the image frame to the opposite corner. In the bottom right corner, an intra refresh pattern 100d according to a more random approach is defined, where separate macroblocks define the intra refresh region for each image frame. In all examples of intra refresh patterns in FIG. 1, all defined macroblocks of pixels of an image frame have been intra refreshed during a cycle of the pattern 100a-d, i.e. over the n image frames (n=3 in these examples) for which a cycle of the intra refresh pattern extends.

In the examples of predefined periodic intra refresh patterns of FIG. 1, the regions in the patterns do not overlap between consecutive image frames. However, according to some embodiments, some overlap may be present.

Figure 2:
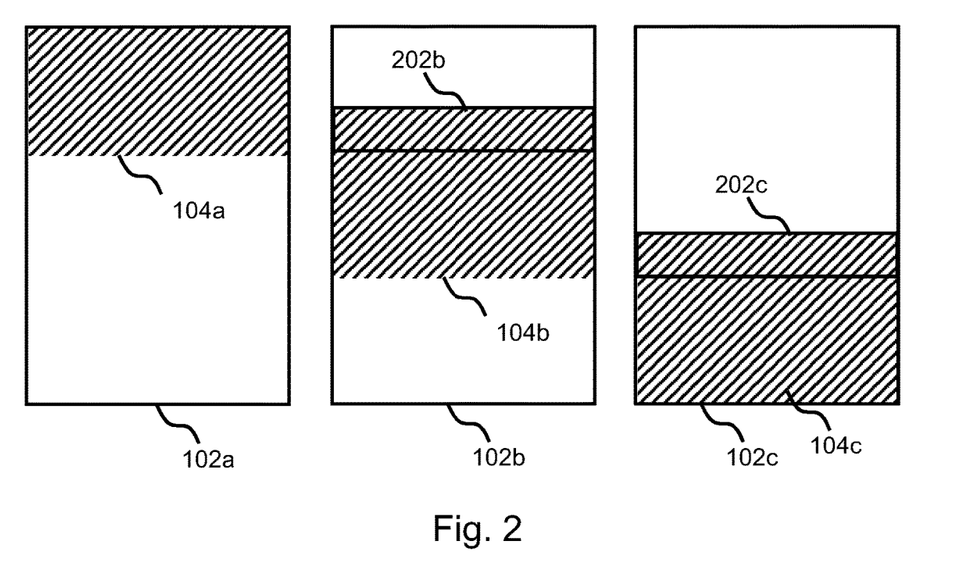
FIG. 2 shows a method for intra refresh encoding of a plurality of image frames of a video stream according to prior art.
Figure 3:
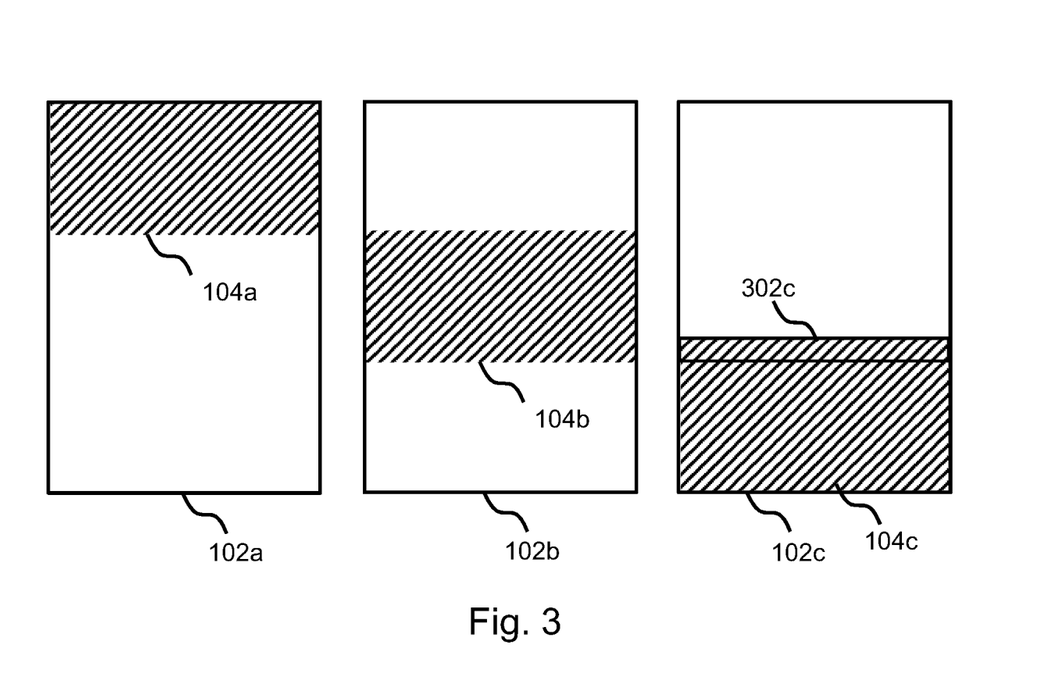
FIG. 3 shows a method for intra refresh encoding of a plurality of image frames of a video stream according to a first embodiment.
Figure 4:
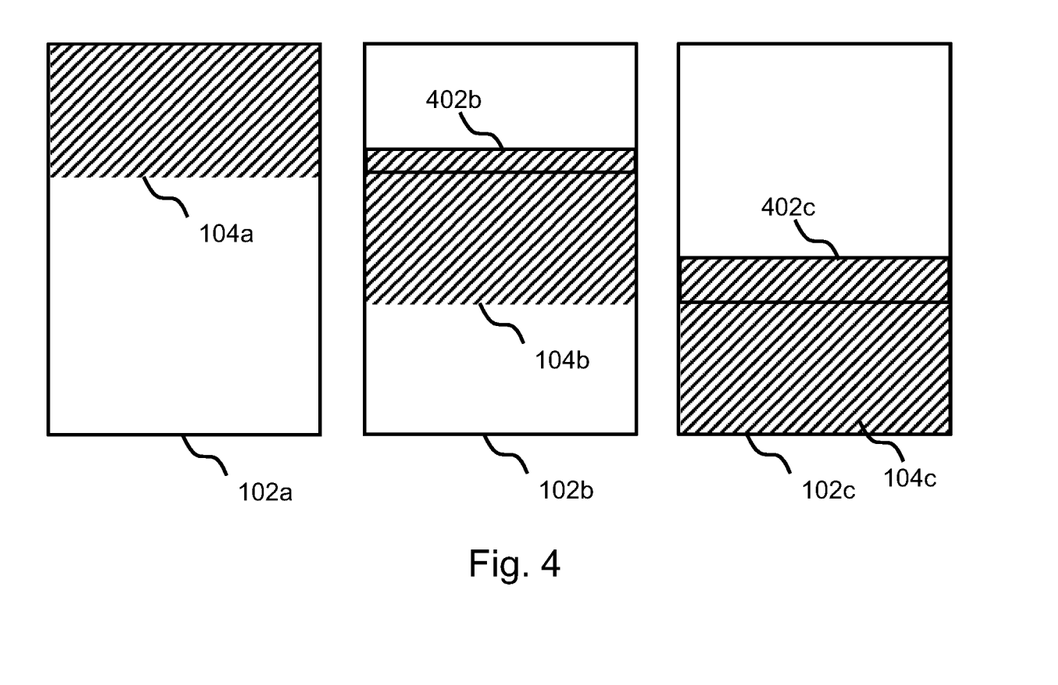
FIG. 4 shows a method for intra refresh encoding of a plurality of image frames of a video stream according to a second embodiment.

In the examples of FIGS. 2-4, the top left example of intra refresh pattern 100a of FIG. 1 is used to exemplify different embodiments. It should be noted that any other of the example patterns 100b-d of FIG. 1 could have been employed, or any other suitable intra refresh pattern not shown in FIG. 1.

When using an intra refresh encoding strategy, the image data (e.g. macroblocks) of the intra refresh region of an image frame is intra-encoded. The remaining image data of the image frame is inter frame encoded, which means that macroblocks of this portion of the encoded image frame are either intra-encoded or inter-encoded. To minimize the bitrate when encoding a plurality of image frames using the intra refresh encoding strategy, it is advantageous that as many macroblocks as possible in the inter frame encoded region are encoded as predicted macroblocks, i.e. inter encoded macroblocks. The choice between encoding a macroblock as an inter or intra is made by the encoder and is based on whether any macroblock in a previous image frame can be found and used for predicting the presently encoded macroblock in an efficient way. In the end, for increased encoding efficiency, as much as possible of new image content in the plurality of image frames to be encoded using an intra refresh strategy needs to be part of the image data of an intra refresh region of an image frame. As can be understood, movements of image data (and new image data) in the border regions between the intra refresh regions of two consecutive image frames may result in that some image content is never included in an intra refresh region.

One solution typically used is to always let the intra refresh regions between two image frames overlap to a certain extent. This may be called intra refresh padding, and FIG. 2 shows an embodiment used in prior art. FIG. 2 shows a first, second and third image frame 102a-c. An intra refresh region 104a-c of the different image frames is determined from the predefined periodic intra refresh pattern. As shown in FIG. 2, the intra refresh region for the second image frame 102b and the third image frame 102c is extended such that an overlap 202b, 202c (shown in FIG. 2 as a dashed area with a border) is formed between the intra refresh region 104a of the first image frame 102a and the intra refresh region 104b of the second image frame 102b, and between the intra refresh region 104b of second image frame 102b and the intra refresh region 104c of the third image frame 102c. With this solution, the intra refresh strategy is less sensitive to movements of content in the image data among the plurality of image frames 102a-c. However, the solution of FIG. 2 comes with an undesirable bitrate penalty (often more than 20-30% extra), since a larger part of the image data of the second and third image frame 102b-c is forced to be intra encoded. As an example, for a FHD video where each image frame has a size of 68 macroblocks in height, with a size difference of ×100 between coding an intra block and an inter block (common in a low motion scene) applying a two block padding between the intra encoding regions of the image frames of the video stream would yield a >100% bitrate increase.

The size of the padding may be adapted to how big a part of the of image data of an image frame that has changed as compared to image data of a previous image frame of the video stream, since a low motion scene does not need as much padding as a high motion scene to still achieve an efficient encoding.

Figure 5A:
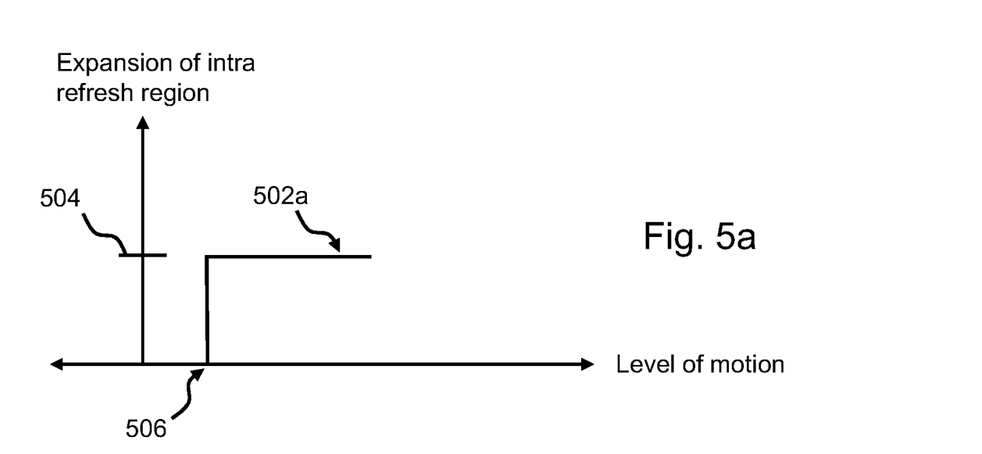
FIGS. 5A-C show embodiments of mapping between a level of motion and an expansion of an intra refresh region.
Figure 6:
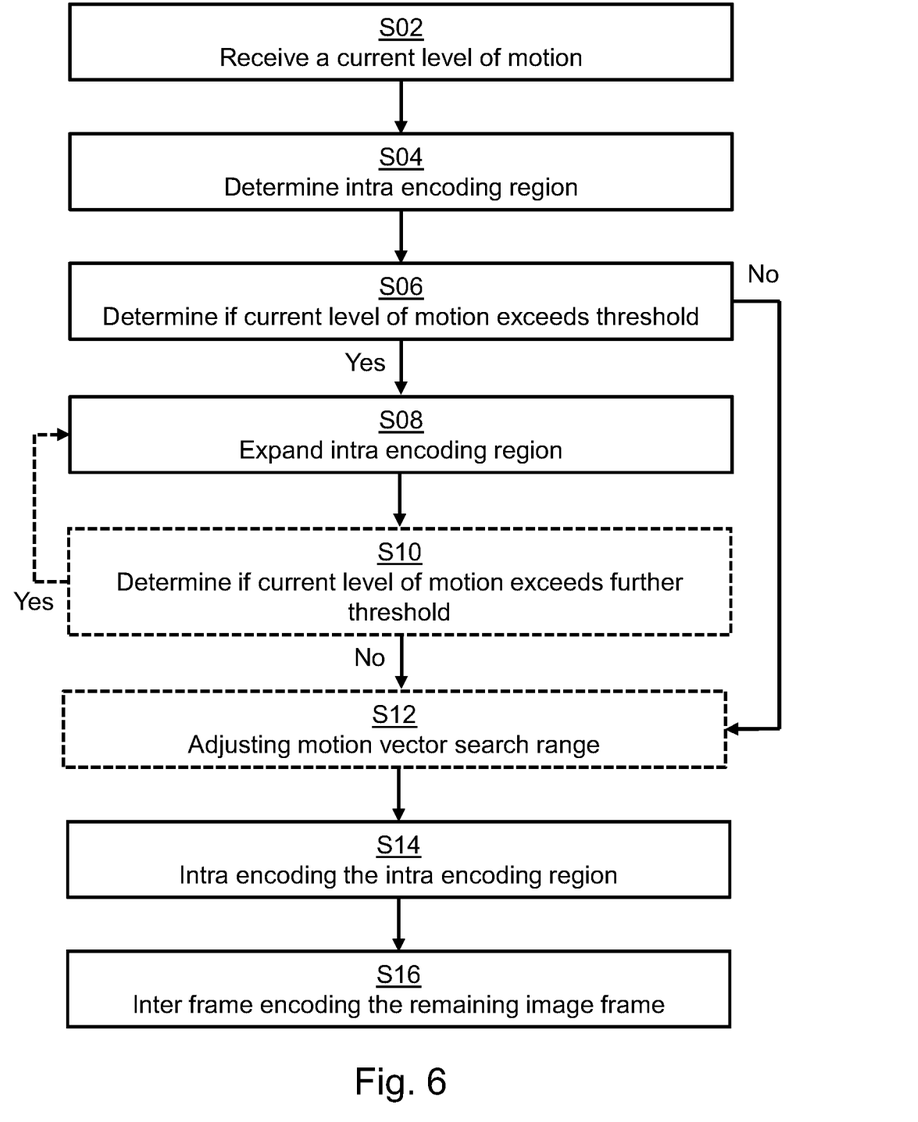
FIG. 6 shows a flow chart of a method for intra refresh encoding of a plurality of image frames of a video stream according to embodiments.

FIG. 3 shows by way of example one embodiment of an intra refresh encoding method, which will be described in conjunction with FIG. 5A and FIG. 6. FIG. 3 shows a first, second and third image frame 102a-c. For the first image frame 102a, an intra encoding region 104a is determined according to a predefined periodic intra refresh pattern (top left in FIG. 1). Consequently, the upper part (intra encoding region 104a) of the image frame 102a is forced to be intra encoded. For the remaining part of the image frame 102a, the image data is intra frame encoded.

For the second image frame 102b, a current level of motion is received S02. In this example, a mapping scheme 502a of FIG. 5A is used to determine if an expansion of the intra encoding region 104b determined S04 for this image frame should be performed or not. For the second image frame 102b, it is determined S06 that the current level of motion does not exceed a first threshold 506. As can be seen in FIG. 5A, this means that no extension of the intra refresh region 104b should be performed. For the second image frame 102b, this means that the intra encoding region 104b is not expanded, and the image data in that region is forced to be intra encoded S14. The remaining image frame is inter frame encoded S16. This means that no extra part of the second image frame 102b is forced to be intra encoded, which is, for a low motion scene (current level of motion below the threshold), advantageous from an efficiency point of view and will reduce the bitrate as compared to e.g. the embodiment of FIG. 2 where padding (expansion) between intra refresh regions is always made.

For the third image frame 102c, a current level of motion is received S02. The mapping scheme 502a of FIG. 5A is used to determine if an expansion of the intra encoding region 104c determined S04 for this image frame 102c should be performed or not. For the third image frame 102c, it is determined S06 that the current level of motion exceeds the first threshold 506. As can be seen in FIG. 5a, this means that extension of the intra refresh region 104b should be performed. Consequently, the intra encoding region 104c of the third image frame 102c is expanded S08 to overlap to a determined extent 302c with the intra encoding region 104b of the previously encoded image frame 102b (which in this embodiment is temporally preceding to the third image frame). The extent of the overlap is determined by the mapping scheme 502a used, and in this case correspond to a maximum expansion 504 defined in the mapping scheme 502a. The expansion of the intra encoding region 104c is made by increasing a height of the intra encoding region 104c, which is a low complexity way of expanding the region 104c. This depends on the intra refresh pattern used, and if the intra refresh pattern of the bottom left embodiment of FIG. 1 was used instead, the expansion may be made by increasing a width of the intra encoding region of the image frame instead.

By expanding the intra encoding region 104c, the block matching algorithm may still function efficiently despite the movement of image data.

FIG. 4 shows by way of example one embodiment of an intra refresh encoding method, which will be described in conjunction with FIG. 5B and FIG. 6. FIG. 4 shows a first, second and third image frame 102a-c. For the first image frame 102a, an intra encoding region 104a is determined according to a predefined periodic intra refresh pattern (top left in FIG. 1). Consequently, the upper part (intra encoding region 104a) of the image frame 102a is forced to be intra encoded. For the remaining part of the image frame 102a, the image data is intra frame encoded.

For the second image frame 102b, a current level of motion is received S02. A mapping scheme 502b of FIG. 5B is used to determine if an expansion of the intra encoding region 104b determined S04 for this image frame 102b should be performed or not. For the second image frame 102b, it is determined S06 that the current level of motion exceeds the first threshold 506. Different from the mapping scheme 502a in FIG. 5A, the mapping scheme 502b used for the plurality of image frames 102a-c of FIG. 4 defines more than one level of expansion of the intra encoding region depending on the current level of motion. In this embodiment, if it determined that the current level of motion exceeds the first threshold 506, the current level of motion is compared to a second threshold 508. For the second image frame 102b, the current level of motion does not exceed the second threshold 508. Consequently, the intra encoding region 104b is expanded S08 to determined extent 402b, according to the level of expansion 510 defined by the mapping scheme 502b. The different regions of the second image frame 102b is then encoded S14, S16 as explained above in conjunction with FIG. 3.

For the third image frame 102c, a current level of motion is received S02. The mapping scheme 502b of FIG. 5B is used to determine if an expansion of the intra encoding region 104c determined S04 for this image frame 102c should be performed or not. For the third image frame 102c, it is determined S06 that the current level of motion exceeds the first threshold 506. As described above, in this embodiment, if it determined S06 that the current level of motion exceeds the first threshold 506, the current level of motion is compared to a second threshold 508. For the third image frame 102c, it is determined S10 the current level of motion exceeds the second threshold 508. Consequently, the intra encoding region 104c is expanded S08 to determined extent 402c, according to the level of expansion 512 defined by the mapping scheme 502b. The different regions of the second image frame 102b is then encoded S14, S16 as explained above in conjunction with FIG. 3.

Figure 5B:
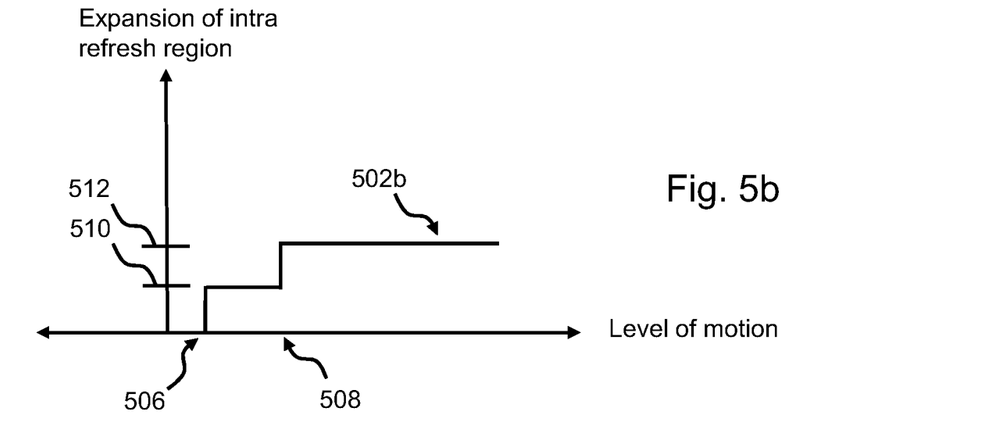
Figure 5C:
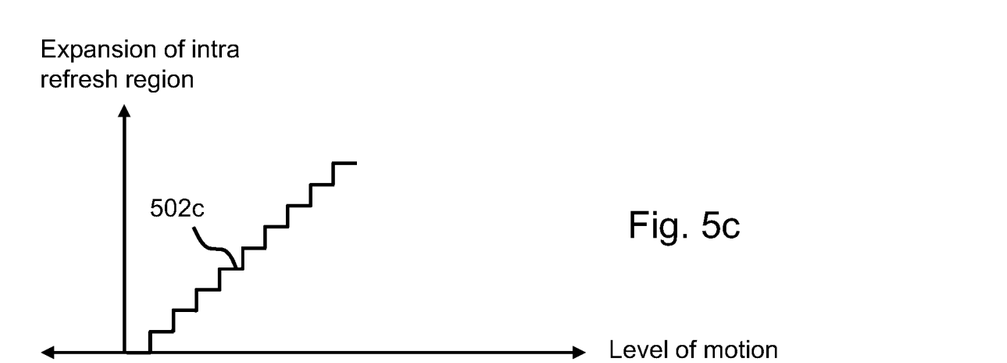

It should be noted that the three level expansion scheme 502b of FIG. 5B is described by way of example, and can be extended to a four, six, ten, etc., level expansion scheme. This is schematically shown in FIG. 6, where according to some embodiments, the current level of motion can be compared S10 to a plurality of thresholds resulting in further expansion(s) S08 of the intra refresh region. This way of expanding the intra refresh region is only by way of example, and according to some embodiment, the current level of motion is directly mapped to a specific level of expansion (i.e. as defined in FIGS. 5A-C), and the intra refresh region is expanded accordingly. According to some embodiments, a semi-continuous mapping between the current level of motion and the expansion of the intra refresh region is employed, e.g. as shown in FIG. 5C. The mapping scheme 502c defines an expansion of the intra refresh region in steps depending on the size of the macroblock, e.g. 16×16 pixels.

In the embodiment of FIG. 4, if it is determined that an expansion of the intra encoding region should be made due to the current level of motion exceeding the first threshold 506, the actual extent of the expansion depends on the current level of motion. As shown in FIG. 4, the extent 402c of the overlap in the third image frame 102c is larger than the extent 402b of the overlap in the second image frame, since the current level of motion for the third image frame 102c is larger than the current level of motion for the second image frame 102b. Advantageously, the bitrate for the encoded image frames of the embodiment of FIG. 4 may be further optimized, compared to the two level mapping scheme (expansion scheme) of the embodiment of FIG. 3.

In the embodiments of FIGS. 3 and 4, the intra encoding region of an image frame is expanded to overlap with an intra encoding region of an immediately preceding image frame in the video stream. Depending on the encoding method used, the intra encoding region of an image frame is expanded to overlap with an intra encoding region of an immediately preceding referenced image frame in the video stream instead, for example in the case where every other frame in the video stream corresponds to an empty frame. In other embodiments, as described above, also a temporally subsequent image frame and its intra encoding region may be used as reference for determining the expansion.

The above described method of defining an overlap between intra refresh regions in a video stream may according to some embodiments be extended to also define a motion vector search range for the inter frame encoding of the remaining image frame (i.e. encoding of image data not being part of the intra encoding region of the image frame). As described above, the overlap is defined to increase the possibility of a successful block matching between referenced image frames even though content in the captured scene have moved in between the capturing of the image frames. Consequently, the determined overlap of intra encoded regions can advantageously be used for also setting the motion vector search range of the encoder. Consequently, according to some embodiments, the method of FIG. 6 can be extended to also adjust (set) S12 the motion vector search range depending to the overlap between the intra refresh regions (intra refresh padding). According to some embodiments, upon the current level of motion not exceeding the first threshold 506, the motion vector search range for the inter frame encoding of the remaining image frame is adjusted (limited) S12 from a current motion vector search range to a predefined search range, for example zero or one macroblock search range. For the embodiment of FIG. 4, the determined extent of overlap depending on the level of motion which exceeds the first threshold 506 can be used for adjusting the motion vector search range. For example, upon the current level of motion exceeding the second threshold, the motion vector search range for the inter frame encoding of the remaining image frame is adjusted S12 to correspond to the first extent. If the first extent defines a three, or two, macroblock overlap, the motion vector search range may be adjusted S12 to three or two macroblocks. Similarly, upon the current level of motion not exceeding the second threshold, the motion vector search range for the inter frame encoding of the remaining image frame may be adjusted S12 to correspond to the second extent. If the second extent defines a two, or one, macroblock overlap, the motion vector search range may be adjusted S12 to two or one macroblocks.

The methods described above are advantageously implemented by an encoder with one or more processors configured for performing the method.

Figure 7:
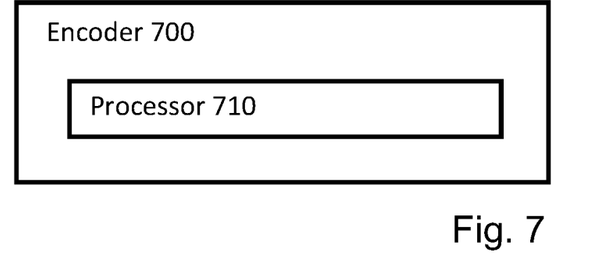
FIG. 7 shows a block diagram of an encoder according to an embodiment.
Figure 8:
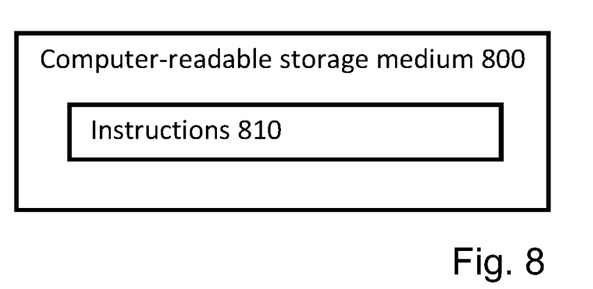
FIG. 8 shows a block diagram of a computer-readable storage medium according to an embodiment.
Figure 9:
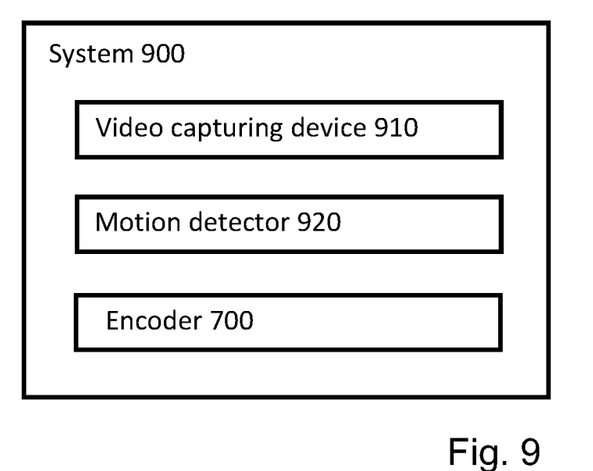
FIG. 9 shows a block diagram of a system according to an embodiment.

FIG. 7 shows a block diagram of an encoder according to an embodiment. The encoder 700 has a processor 710. FIG. 8 shows a block diagram of a computer-readable storage medium according to an embodiment. The computer-readable storage medium 800 has instructions 810. FIG. 9 shows a block diagram of a system according to an embodiment. As shown in FIG. 9, the encoder 700 may form part of a system 900 further comprising a video capturing device 910, such as a monitoring camera, and a motion detector 920. The motion detector 920 may be implemented in the video capturing device 910 or in the encoder 700. In some embodiments, both the motion detector and the encoder are implemented in the video capturing device.

In such a system 900, the video capturing device 910 is configured to capture a video stream depicting a scene, the video stream comprising a plurality of image frames, and continuously transmit the image frames of the video stream to the motion detector and the encoder. The motion detector 920 is configured to continuously detect a current level of motion in the captured image frames based on image data in the received image frames and to transmit the current level of motion to the encoder. The detected motion may depend on motion in the scene and/or changes in the field of view of the video capturing device. The motion detection 920 may, as described previously, according to some embodiments only be performed on some of the captured image frames, for reducing computational complexity.

The methods described above may also be implemented in a software stored on a computer-readable storage medium.

In the above the embodiments have mainly been described with reference to a limited number of examples. However, as is readily appreciated by a person skilled in the art, other examples than the ones disclosed above are equally possible within the scope of the embodiments, as defined by the appended claims. For example, when adjusting the motion vector search range (S12 in FIG. 6), according to some embodiments, the vector search range is only adjusted S12 in a horizontal or a vertical direction, based on the extent of overlap between the intra encoding region of a current image frame and the intra encoding region of a previous image frame, wherein the direction in which the vector search range is set/restricted is based on the predefined periodic intra refresh pattern. For example, the motion vector search range may be adjusted S12 in a direction (e.g. horizontal or vertical) corresponding to the direction of displacement of the intra encoded regions in the periodic intra refresh pattern.

The invention claimed is:

1. A method for intra refresh encoding of a plurality of image frames of a video stream, wherein the intra refresh encoding is based on a predefined periodic intra refresh pattern defining a region of an image frame that should be intra encoded, the method comprising, for each image frame:
   receiving a current level of motion associated with the image frame;
   determining an intra encoding region of the image frame according to the predefined periodic intra refresh pattern;
   upon the current level of motion not exceeding a first threshold:
      intra encoding the intra encoding region of the image frame; and
      inter frame encoding the regions of the image frame different from the intra encoding region;
   upon the current level of motion exceeding the first threshold:
      expanding the intra encoding region of the image frame to include the intra encoding region of the image frame that would have been intra encoded had the level of motion not exceeded the first threshold and an additional portion of the image frame to overlap to a determined extent with a previously encoded intra encoding region among the plurality of image frames;
      intra encoding the expanded intra encoding region of the image frame; and
      inter frame encoding the regions of the image frame different from the expanded intra encoding region.

2. The method of claim 1, wherein for the plurality of image frames, the regions in the predefined periodic intra refresh pattern do not overlap.

3. The method of claim 1, wherein the expanding the intra encoding region of the image frame comprises:
   expanding the intra encoding region of the image frame to overlap with an intra encoding region of an immediately preceding referenced image frame in the video stream.

4. The method of claim 1, further comprising:
   upon the current level of motion exceeding the first threshold:
      upon the current level of motion exceeding a second threshold, the second threshold being larger than the first threshold,
         expanding the intra encoding region of the image frame to overlap to a first extent with a previously encoded intra encoding region among the plurality of image frames,
      upon the current level of motion not exceeding the second threshold,
         expanding the intra encoding region of the image frame to overlap to a second extent with a previously encoded intra encoding region among the plurality of image frames, wherein the first extent is larger than the second extent.

5. The method of claim 1, wherein the intra encoding region is defined by one or more slices or tiles and the expanded intra encoding region is defined by one or more slices or tiles.

6. The method of claim 1, wherein the predefined periodic intra refresh pattern defines an intra encoding region being displaced only in a vertical direction or in a horizontal direction between two consecutive image frames.

7. The method of claim 6, wherein the predefined periodic intra refresh pattern defines an intra encoding region being displaced in the vertical direction, wherein the step of expanding the intra encoding region of the image frame comprises increasing a height of the intra encoding region of the image frame.

8. The method of claim 6, wherein the predefined periodic intra refresh pattern defines an intra encoding region being displaced in the horizontal direction, wherein the expanding the intra encoding region of the image frame comprises increasing a width of the intra encoding region of the image frame.

9. The method of claim 1, further comprising:
   upon the current level of motion not exceeding the first threshold, adjusting a motion vector search range for the inter frame encoding of the remaining image frame from a current search range to a predefined search range.

10. The method of claim 4, further comprising: upon the current level of motion exceeding the second threshold, adjusting the motion vector search range for the inter frame encoding of the remaining image frame to correspond to the first extent, and
   upon the current level of motion not exceeding the second threshold, adjusting the motion vector search range for the inter frame encoding of the remaining image frame to correspond to the second extent.

11. An encoder configured for intra refresh encoding of a plurality of image frames of a video stream, wherein the intra refresh encoding is based on a predefined periodic intra refresh pattern defining a region of an image frame that should be intra encoded, the encoder comprises a processor configured to:
   receive a current level of motion associated with an image frame;
   determine an intra encoding region of the image frame according to the predefined periodic intra refresh pattern;
   upon the current level of motion not exceeding a first threshold:
      intra encode the intra encoding region of the image frame; and
      inter frame encode the regions of the image frame different from the intra encoding region;
   upon the current level of motion exceeding the first threshold:
      expand the intra encoding region of the image frame to include the intra encoding region of the image frame that would have been intra encoded had the level of motion not exceeded the first threshold and an additional portion of the image frame to overlap to a determined extent with a previously encoded intra encoding region among the plurality of image frames;
      intra encode the expanded intra encoding region of the image frame; and
      inter frame encode the regions of the image frame different from the expanded intra encoding region.

12. The encoder of claim 11, wherein the processor is further configured to, upon the current level of motion exceeding a second threshold, the second threshold being larger than the first threshold:
   expand the intra encoding region of the image frame to overlap to a first extent with a previously encoded intra encoding region among the plurality of image frames,
   upon the current level of motion not exceeding the second threshold, expand the intra encoding region of the image frame to overlap to a second extent with a previously encoded intra encoding region among the plurality of image frames, wherein the first extent is larger than the second extent.

13. The encoder of claim 11, wherein the processor is further configured to:
upon the current level of motion not exceeding the first threshold, adjusting a motion vector search range for the inter frame encoding of the remaining image frame from a current search range to a predefined search range.

14. A system comprising:
a video capturing device;
a motion detector; and
an encoder configured for intra refresh encoding of a plurality of image frames of a video stream, wherein the intra refresh encoding is based on a predefined periodic intra refresh pattern defining a region of an image frame that should be intra encoded;
wherein the video capturing device is configured to capture a video stream depicting a scene, the video stream comprising a plurality of image frames, and to continuously transmit the image frames of the video stream to the motion detector and the encoder; and
wherein the encoder comprises a processor configured to:
receive a current level of motion in the scene;
determine an intra encoding region of the image frame according to the predefined periodic intra refresh pattern;
upon the current level of motion not exceeding a first threshold:
intra encode the intra encoding region of the image frame; and
inter frame encode the regions of the image frame different from the intra encoding region;
upon the current level of motion exceeding the first threshold:
expand the intra encoding region of the image frame to include the intra encoding region of the image frame that would have been intra encoded had the level of motion not exceeded the first threshold and an additional portion of the image frame to overlap to a determined extent with a previously encoded intra encoding region among the plurality of image frames;
intra encode the expanded intra encoding region of the image frame; and
inter frame encode the regions of the image frame different from the expanded intra encoding region.

15. A non-transitory computer-readable storage medium storing instructions which, when executed by a computing device having a processing capability, cause the computing device to executing instructions for intra refresh encoding of a plurality of image frames of a video stream, wherein the intra refresh encoding is based on a predefined periodic intra refresh pattern defining a region of an image frame that should be intra encoded, the instructions causing the computing device to perform operations comprising, for each image frame:
receiving a current level of motion associated with the image frame;
determining an intra encoding region of the image frame according to the predefined periodic intra refresh pattern;
upon the current level of motion not exceeding a first threshold:
intra encoding the intra encoding region of the image frame; and
inter frame encoding the regions of the image frame different from the intra encoding region;
upon the current level of motion exceeding the first threshold:
expanding the intra encoding region of the image frame to include the intra encoding region of the image frame that would have been intra encoded had the level of motion not exceeded the first threshold and an additional portion of the image frame to overlap to a determined extent with a previously encoded intra encoding region among the plurality of image frames;
intra encoding the expanded intra encoding region of the image frame; and
inter frame encoding the regions of the image frame different from the expanded intra encoding region.

* * * * *